Figure 1:
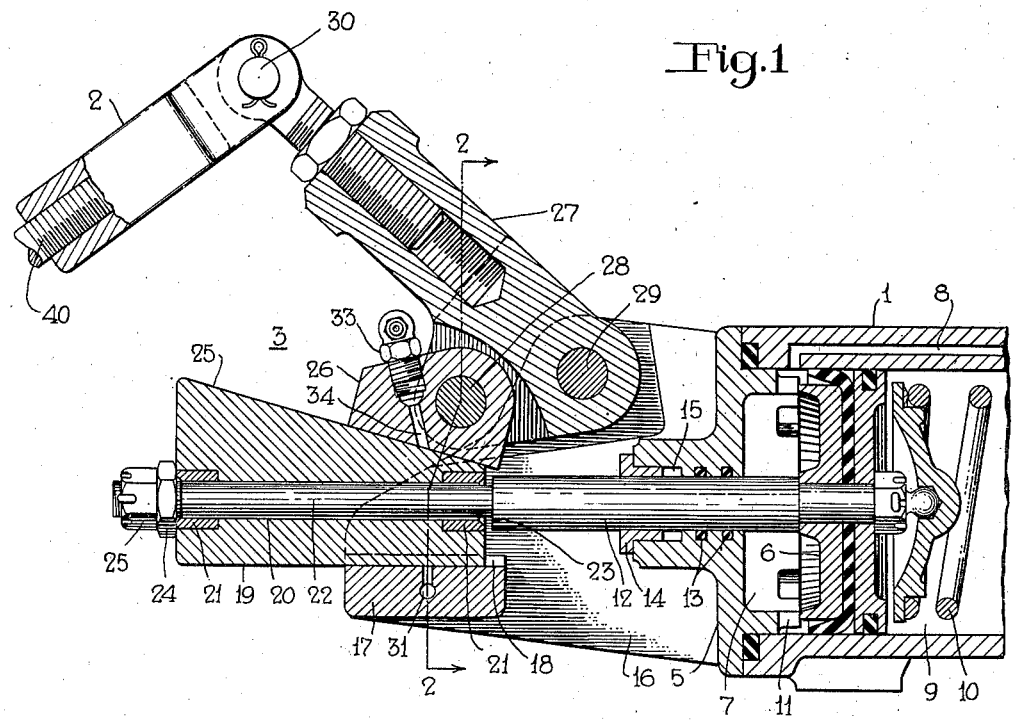

June 29, 1948.     C. S. KELLEY     2,444,260
CONTROL APPARATUS
Filed Dec. 27, 1944

INVENTOR.
Cecil S. Kelley
BY
ATTORNEY

Patented June 29, 1948

2,444,260

UNITED STATES PATENT OFFICE 2,444,260

CONTROL APPARATUS

Cecil S. Kelley, Forest Hills, Pa., assignor to The Westinghouse Air Brake Company, Wilmerding, Pa., a corporation of Pennsylvania Application December 27, 1944, Serial No. 569,999

3 Claims. (Cl. 74—110)

This invention relates to control apparatus and more particularly to means for controlling the adjustment of a device, such as a speed governor for controlling the speed of an internal combustion engine.

Certain internal combustion engines are provided with speed governors of the type embodying adjustable control spring means arranged to oppose centrifugal action of revolving weights for regulating the supply of fuel to the engine, and thereby the speed of the engine, in accordance with the adjusted force of said spring means. The adjustment of the governor spring means may be controlled by resilient means in the form of an air motor embodying a power piston connected to the spring means and operable by fluid under pressure to vary the pressure of said spring means in proportion to the pressure of such fluid, to thereby vary the engine speed correspondingly.

With a structure of the above type, if the pressure of fluid on the power piston is increased, the governor will operate to increase the fuel supply to the engine to cause acceleration thereof. As the engine approaches the desired speed, the governor will act to reduce the supply of fuel to the engine in order to prevent the speed exceeding that desired. However, as the engine speed is increased, the increased centrifugal action of the governor weights will increase the reactive force of the governor spring means on the power piston which may cause said piston to yield or move from its selected position against the controlling air pressure, and such yielding will change the adjustment of the spring means so as to permit the governor to operate to reduce the fuel supply to a degree greater than desired or would otherwise occur. As a result, the engine speed may then reduce to a degree below the normal or chosen speed and cause another change in the reactive force of the spring means on the piston and possibly another change in position of said piston and in the adjustment of said spring means to again increase the fuel supply to the engine and again increase its speed. This oscillatory operation of the engine, the governor and of the governor control piston, commonly known as "hunting," may thus continue for a certain interval of time before equilibrium between the centrifugal forces of the governor, the force of the spring means and the pressure of fluid on the power piston is obtained, at which time the engine will be operating at the chosen or normal speed.

Oscillatory or "hunting" operation of an engine and a governor and the length of time during which such action may continue, may be even greater than above described in case the pressure of fluid on the governor spring adjusting piston is controlled by a self-lapping valve mechanism which will become unbalanced in response to changes in position of the power piston, since as the engine and governor oscillate or "hunt" as above described, such unbalancing may result in a greater amplitude of "hunting" and in a longer period of time before equilibrium will be obtained between the centrifugal force of the governor, the pressure of the governor control spring means, the pressure of fluid on the control piston and the controlling forces on the self-lapping mechanism.

Further, oscillatory or "hunting" operation of an engine, the governor, the governor control piston and a self-lapping valve mechanism for controlling the pressure of fluid on said piston may be of a relatively small degree in case of operation of said mechanism to provide a relatively small degree of change in engine speed, but may be relatively severe when said mechanism is operated to initiate a relatively great degree of change in engine speed, or in case the load on the engine is suddenly removed.

One object of the invention is therefore the provision of a novel fluid pressure control apparatus for adjusting a device, such as an engine speed governor, which is so constructed as to prevent any change in such adjustment by force from the device being controlled.

According to this object, I provide a locking means in the connection between the fluid control power piston and the governor control spring means which is effective to prevent changes in the adjusted position of said piston by surges of increase in the reactive force of the governor control spring means on the power piston incident to acceleration of the engine, whereby any chosen adjustment of said spring means will be maintained against such surges to minimize "hunting" of the governor and engine. Upon deceleration of the engine the reduction in the reactive force of the governor control spring means and its effect on the power piston and thereby upon "hunting" of the governor is of negligible degree because of the reduced centrifugal effect of the governor on said spring means at the reduced speed. The locking means embodying the invention is therefore effective only to prevent changes in adjustment of the governor by increases in pressure of the governor control spring means, as above pointed out.

Other objects and advantages will be apparent from the following more detailed description of the invention.

Figure 2:
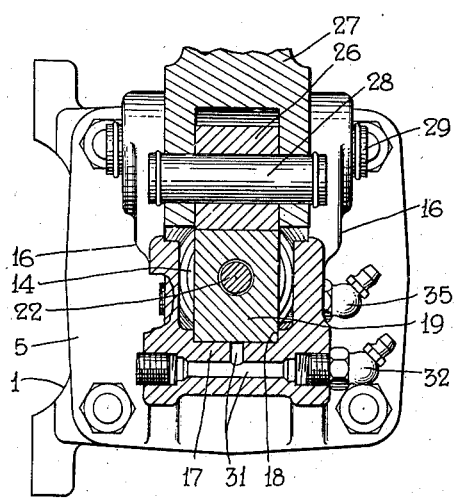

In the accompanying drawing: Fig. 1 is a diagrammatic longitudinal sectional view of a control apparatus embodying the invention; Fig. 2 is a sectional view taken on the line 2—2, in Fig. 1; and Fig. 3 is a diagrammatic view of a speed governor controlling structure, such as above described.

*General description*

Figure 3:
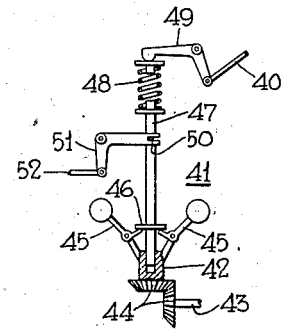

In the drawing, the reference numeral 40 indicates an adjustable rod for adjusting any selected device, such as an engine speed governor indicated generally by the reference numeral 41 in Fig. 3, the reference numeral 1 indicates a portion of a fluid motor for adjusting said device, and the reference numeral 3 indicates a structure for operatively connecting said motor to said speed governor.

*Description of speed governor 41*

The speed governor 41, which is shown in the drawing in simple diagrammatic form, comprises a rotatable governor head 42 adapted to be revolved by any suitable rotatable part of an internal combustion engine, such for example as a cam shaft 43, through the medium of gears 44. The head 42 pivotally carries two oppositely arranged bell cranks 45 having governor weights at their outer ends while their adjacent inner ends engage a collar 46 secured to a longitudinally movable adjusting rod 47. A governor control spring 48 acts against rod 47 in opposition to centrifugal action of bell cranks 45 upon rotation of the head 42 with the engine cam shaft 43. A bell crank 49 pivoted at its knee is operable upon counterclockwise rotation to increase the pressure of spring 48 and upon clockwise rotation to reduce the pressure of said spring. The rod 40 connected to bell crank 49 is operative to turn said bell crank for adjusting the pressure of spring 48.

The adjusting rod 47 is provided with an operating pin 50 disposed in a notch in the end of one arm of a bell crank 51 which is fulcrumed at its knee. Pivotally connected to the other arm of bell crank 51 is a rod 52 to be controlled. It may be assumed that rod 52 is adapted to control the fuel rack on the engine (Diesel engine) for regulating the fuel supply to the engine, and that movement of said rod in the direction of the left hand will increase the supply of fuel to said engine, while movement in the direction of the right hand will reduce the supply of fuel to the engine. It will further be noted that movement of rod 40 in the direction of the right hand will act to adjust the governor 41 to move the rod 52 to increase the fuel supply to the engine while movement in the opposite direction will act to adjust said governor to move rod 52 in the direction to reduce the fuel supply to the engine.

Now let it be assumed that the engine is operating at a normal speed determined by the adjustment of rod 40 and under which condition the centrifugal action of the governor bell cranks 45 will be balanced by the opposing force of spring 48. If rod 40 is now adjusted toward the right hand to increase the speed of the engine, the increase in centrifugal force of the bell cranks 45 as the engine accelerates will act to increase the reactance of spring 48 which will tend to move rod 40 in the direction of the left hand. A sudden increase in pressure of spring 48, with a resultant tendency to draw rod 40 in the direction of the left hand, will also occur upon acceleration of the engine due to sudden removal of the load from the engine, as will be apparent.

It will now be seen that if the rod 40 is adjusted by pressure of fluid acting on a power piston, the adjustment of said rod and thereby of the governor may tend to change from that desired incident to an increase in speed of the engine because of the resiliency of the controlling fluid pressure on said piston, and this is undesired for reasons above pointed out.

*Description of fluid motor 2 and structure 3*

The fluid motor 1 may be like the fluid motor fully disclosed in my copending application, Serial No. 536,487, filed May 20, 1944 now Patent No. 2,411,748 and assigned to the assignee of the present application. Since reference may be made to this copending application only a portion of the motor 1 is shown in the present application and will now be described only in sufficient detail to provide a clear understanding of the invention.

The fluid motor 1 comprises a casing having a piston bore one end of which is closed by a pressure head 5 and in which there is slidably mounted a power piston 6. Between the pressure head 5 and piston 6 is a pressure chamber 7 to which is connected one end of a passage 8 through which fluid under pressure is adapted to be supplied to and released from said chamber for controlling the positioning of the piston 6 in its bore. At the opposite side of the power piston 6 is a nonpressure chamber 9 containing a coil control spring 10 one end of which bears against piston 6 in opposition to pressure of fluid in chamber 7.

Upon supply of fluid under pressure to chamber 7 the piston 6 will move against the opposing pressure of spring 10 to a position determined by the pressure of such fluid, while upon release of fluid under pressure from chamber 7 the spring 10 will move the piston 6 to a position determined by the reduction in such pressure. When the pressure of fluid in chamber 7 is sufficiently reduced the piston 6 will be moved by spring 10 to the position in which it is shown in the drawing, which position is determined by contact of the piston with a stop 11. This latter position of the piston 6 will be assumed to be that which said piston will occupy for adjusting the speed governor 41, in a manner to be later described, to provide for operation of the engine at idling speed, while movement of said piston to any position to the right of that in which it is shown in the drawing will act to cause adjustment of said governor to effect operation of the engine at a speed in excess of idling speed by an amount proportional to the distance said piston is out of its idling position.

The supply of fluid under pressure to and its release from chamber 7 by way of passage 8 may be controlled by a fluid pressure controlled self-lapping valve mechanism fully disclosed in my copending application hereinbefore referred to, but not shown in the present application since it is not deemed essential to a clear understanding of the invention. It may be merely pointed out that, in case of leakage of fluid under pressure either into or out of chamber 7 after the piston 6 has been moved to a selected position, there may be a slight oscillatory movement, or "hunting," of said piston to cause operation of the self-lapping mechanism to maintain the pressure of fluid in chamber 7 substantially at a chosen pressure. This "hunting" in devices of this type is well known and no further description is necessary in this application.

One end of a piston rod 12 is secured to piston 6 for movement therewith. The rod 12 extends from piston 6 through pressure chamber 7 and a suitable opening in pressure head 5 to the exterior of said head. The pressure head 5 is provided with two annular grooves in each of which is disposed a packing ring 13 having sealing and sliding contact with the peripheral surface of rod 12 for preventing leakage of fluid under pressure from chamber 7. Adjacent the outermost packing 13, the pressure head 5 has a packing gland 14 secured to said head and at the inner end of said gland is an annular recess 15 encircling the rod 12 for carrying lubricant to lubricate the surface of said rod which slides through said head.

Projecting from pressure head 5 are two parallel walls or arms 16. These arms are spaced apart and disposed one at either side of the rod 12, and the outer ends of said arms are connected by an integrally formed bridge 17. At one side of the piston rod 12, the bridge 17 has a groove 18 extending from one end of the bridge to the opposite end and parallel to the axis of said rod. The bottom of this groove is flat, and slidably mounted thereon and between the side walls of the groove is an actuating member 19. The actuating member 19 has a through bore 20 arranged in coaxial relation with the piston rod 12 and parallel to the bottom of the groove 18. The opposite ends of bore 20 are provided with through wear sleeves 21 secured in opposite ends of the actuating member 19, and freely extending through this bore is a portion 22 of the piston rod 12 which is of less diameter than that of the rod 12. At one end of the reduced portion 22 of the piston rod there is a shoulder 23 arranged for contact with the adjacent sleeve 21, while at the opposite end of said reduced portion is a nut 24 which is secured in an adjusted position on the rod by a lock nut 25. The nut 24 is provided for engagement with the adjacent end of the other sleeve 21. The space between the shoulder 23 and nut 24 exceeds the length of bore 20 by an amount equal at least to the possible "hunting" movement of piston 6, above described, so that such "hunting" movement may be relative to, and not cause movement of the actuating member 19.

The actuating member 19 is provided with a flat inclined surface 25 on the side opposite that engaging the bottom of the groove 18, and slidably engaging this surface is the flat surface of a friction shoe 26. The shoe 26 is disposed in a slot provided in one end of a lever 27 and is pivotally mounted on a pin 28 which extends through and is carried by the side walls of said slot. The lever 27 is in the form of a bell crank the knee of which is disposed between the parallel arms or walls 16 extending from the pressure head 5, and said lever is pivotally mounted at its knee on a pin 29 extending through and carried by said arms or walls. An operating link 2 pivotally connected to the opposite end of lever 27 by a pin 30 is operatively connected to the governor adjusting rod 40.

The bridge 17 is provided with a passageway 31 one end of which terminates at the bottom of groove 18 underneath the actuating member 19 while the opposite end is connected to a lubricating fitting 32 through which lubricant is adapted to be supplied to the walls of groove 18 and the contacting surface of the actuating member 19. A lubricating fitting 33 secured to shoe 26 is connected to a passage 34 leading to the friction surface of shoe 26 and the cooperating inclined surface 25 on the actuating member 19 whereby lubricant may be applied to these surfaces. A lubricating fitting 35 (Fig. 2) is provided for connection with a passage (not shown) leading to the annular groove 15 around the piston rod 12, whereby the portion of said rod sliding through the pressure head 5 may be lubricated.

*Operation of fluid motor 1 and device 3 to control governor 41*

When the piston 6 is moved in the direction of the right hand, upon supply of fluid under pressure to chamber 7 the actuating member 19 will move therewith, and due to the resultant wedging action between surface 25 on said member and the engaging surface of shoe 26 the lever 27 will be rocked about the pivot pin 29 in a clockwise direction for drawing the link 2 in the general direction of the right hand. With link 2 connected to rod 40, this operation of piston 6 and thereby of lever 27 will therefore cause operation of bell crank 49 to increase the pressure of the governor spring 48 to cause operation of the governor to increase the speed of the engine. Any desired degree of engine speed may thus be obtained by providing fluid in chamber 17 which will cause movement of lever 27 to the proper position, as will be apparent.

If the pressure of fluid in power piston chamber 7 is reduced, spring 10 will move the power piston 6 and thereby the rod 12 and actuating member 19 in the direction of the left hand, in order that, due to the inclination of surface 25, the lever 27 may be returned toward its normal position shown in the drawing due to the expansive action of spring 48 on bell crank 49. By limiting the degree of reduction in pressure of fluid in chamber 7 and thereby limiting the degree of change in position of the power piston 6 and actuating member 19, the change in position of lever 27 and bell crank 49 and thus the reduction in speed of the engine will be correspondingly limited. It will thus be seen that by providing the proper pressure of fluid in chamber 6, either upon increasing or reducing such pressure, the piston 6 and thereby the lever 27 and bell crank 49 will move to a corresponding position to effect adjustment of the governor control spring 48 to provide a corresponding speed of the engine.

After the piston 6 has been moved to and stopped in a selected position the lost motion between shoulder 23 and nut 24 on the piston rod, and the opposite ends of the actuating member 19 is adapted to permit "hunting" movement of said piston relative to and without moving the actuating member 19 and thus without effect upon adjustment of the governor control spring 48 in case of leakage of fluid under pressure either to or from the power piston chamber 7, as above described.

It is desired that the static and kinetic friction between the contacting surfaces of the actuating member 19, the shoe 26 and bridge 17 be as nearly as possible the same, so that there will not be such a reduction in the frictional force between these surfaces with respect to the actuating force from the piston 6, when the actuating member 19 starts to move, as to allow said piston to jump or overtravel the position in which it is desired it will stop. To obtain this condition, the actuating member 19 is preferably made of a non-metallic material, such as a moulded plastic, while the shoe 26 and bridge 17 are of metal such as bronze, and all of the sliding contacting surfaces are lubricated, as above described.

Now assuming that the engine is operating at some normal speed and the pressure of fluid in piston chamber 7 is increased to cause the piston 6 to move to increase the pressure of the governor control spring 48 to accelerate the engine, the increase in centrifugal force provided by the governor bell cranks 45, due to such acceleration, will act to increase the pressure of said spring against bell crank 49 and thus tend to move the governor adjusting rod 40 in the direction of the left hand (Fig. 3). An even greater tendency to move rod 40 in the direction of the left hand will occur in case the load on the engine is suddenly removed resulting in sudden acceleration of the engine and a surge of increase in pressure of spring 40 tending to move the governor adjusting rod 40 in the direction of the left hand. Under conditions such as just described, the rod 40 will be securely held against change in adjustment however, since the pull exerted by said rod on the lever 27 will press the shoe 26 against the actuating member 29 which will remain stationary because the angle of contact between said shoe and member is such as to lock said member against movement under such a condition. Thus under the conditions as just described, the adjustment of the bell-crank 49 will not change but will remain fixed, so that the speed of the engine will promptly be brought back to the unchanged and selected adjustment of the power piston 6, lever 27, and thereby the bell-crank 49.

Summary

It will now be seen that I have provided a control apparatus for adjusting an engine governor or the like embodying a fluid actuated power piston and actuating means connecting said piston to the governor whereby the governor may be readily adjusted by movement of said piston but which acts to prevent change in the adjustment of said governor and piston by force transmitted back from the governor. The actuating means is in the form of a friction wedge which is readily responsive to movement of the motor piston in either direction for effecting an adjustment of the governor, but the angularity of the wedging surface on said wedge is such as to be self-locking with the shoe 26 in case of application of force from the governor, so as to prevent any change in adjustment of the governor and piston by such force.

Having now described my invention, what I claim as new and desire to secure by Letters Patent, is:

1. A control apparatus comprising rockable lever means to be adjusted, control means, a wedge-like element movable longitudinally by said control means and having a longitudinally extending sloping flat friction surface, a friction shoe pivotally connected to an arm of said lever means and having a flat friction surface in sliding contact with said sloping surface, said wedge-like element being operable upon longitudinal movement to effect displacement of said shoe in either one direction or in the opposite direction to rock said lever means, the angularity of said sloping surface being such as to prevent movement of said wedge-like element by pressure from said shoe.

2. A control apparatus comprising a member to be adjusted, a longitudinally movable element having a first friction surface arranged parallel to the direction of movement of said element and having an oppositely arranged friction surface disposed diagonally to said first friction surface, stationary means supporting said movable element and slidably engaged by said first friction surface, a friction shoe pivotally connected to said member and having a flat surface in sliding contact with said diagonally arranged surface, said movable element being operable upon longitudinal movement to effect operation of said shoe to adjust said member, the angularity of said diagonal surface being such as to render said movable element immovable by force applied thereto from said shoe.

3. A control apparatus comprising a longitudinally movable control rod, an actuating member, means connecting said member to said rod with limited lost motion, said actuating member having a flat friction surface arranged parallel to the axis of said rod and having an oppositely arranged friction surface extending longitudinally and diagonally of the axis of said rod, stationary means supporting said actuating member and slidably engaged by said flat friction surface, a pivoted adjustable member, a friction shoe slidably engaging said diagonal surface and pivotally connected to said adjustable member at a point spaced from its pivot, said actuating member being operable upon movement by said rod in one direction to move said shoe and thereby said adjustable member in one direction and operable upon movement by said rod in the opposite direction to render said shoe and adjustable member movable in the opposite direction, the angularity of said diagonal surface being such as to render said actuating member and rod immovable by force applied thereto by said shoe.

CECIL S. KELLEY.

REFERENCES CITED

The following references are of record in the file of this patent:

UNITED STATES PATENTS

| Number | Name | Date |
| --- | --- | --- |
| 468,915 | Kraiss | Feb. 16, 1892 |
| 498,996 | Unger | June 6, 1893 |
| 667,350 | Ulrich et al. | Feb. 5, 1901 |
| 1,814,632 | Rohr | July 14, 1931 |
| 1,857,917 | Koehler | May 10, 1932 |
| 1,893,254 | Sweeney | Jan. 3, 1933 |
| 2,140,658 | Van Sittert | Dec. 20, 1938 |
| 2,310,625 | Fischer | Feb. 9, 1943 |

FOREIGN PATENTS

| Number | Country | Date |
| --- | --- | --- |
| 51,956 | Germany | May 9, 1890 |
| 822,089 | France | Dec. 20, 1937 |

OTHER REFERENCES

Product Engineering (Publication) Jan. 1938, pp. 28, 29.